US009077872B2

(12) United States Patent
Matsunaga (10) Patent No.: US 9,077,872 B2
(45) Date of Patent: Jul. 7, 2015

(54) DOCUMENT MANAGEMENT APPARATUS AND DOCUMENT MANAGEMENT METHOD

(71) Applicant: FUJI XEROX CO., LTD., Tokyo (JP)

(72) Inventor: Hideki Matsunaga, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/944,153

(22) Filed: Jul. 17, 2013

(65) Prior Publication Data

US 2014/0285849 A1  Sep. 25, 2014

(30) Foreign Application Priority Data

Mar. 22, 2013  (JP) .................................. 2013-059787

(51) Int. Cl.
| | |
|---|---|
| G06F 3/12 | (2006.01) |
| H04N 1/21 | (2006.01) |
| H04N 1/32 | (2006.01) |
| G06F 17/30 | (2006.01) |
| H04N 1/00 | (2006.01) |

(52) U.S. Cl.
CPC .......... *H04N 1/2166* (2013.01); *H04N 1/00204* (2013.01); *G06F 3/1296* (2013.01); *H04N 2201/3243* (2013.01); *H04N 1/32101* (2013.01); *H04N 2201/0081* (2013.01); *H04N 2201/218* (2013.01); *H04N 2201/3214* (2013.01); *H04N 2201/3274* (2013.01); *H04N 2201/0087* (2013.01); *H04N 2201/3226* (2013.01); *H04N 2201/0082* (2013.01); *G06F 17/30011* (2013.01)

(58) Field of Classification Search
USPC ............... 358/1.13, 1.15, 1.16, 403; 709/203, 709/218, 219
See application file for complete search history.

(56) References Cited

U.S. PATENT DOCUMENTS

| | | | | |
|---|---|---|---|---|
| 7,882,125 | B2 * | 2/2011 | Tamura | 707/769 |
| 2011/0235111 | A1 * | 9/2011 | Nakawaki | 358/1.15 |
| 2011/0242594 | A1 * | 10/2011 | Yabe | 358/1.15 |

FOREIGN PATENT DOCUMENTS

| | | |
|---|---|---|
| JP | A-10-260875 | 9/1998 |
| JP | A-2001-5700 | 1/2001 |

* cited by examiner

*Primary Examiner* — Vu B Hang
(74) *Attorney, Agent, or Firm* — Oliff PLC (57) ABSTRACT

A document management apparatus includes a holding unit, a searching unit, and a deletion unit. The holding unit holds print data that includes an image of a printed document and attribute information on the printed document. In a case where an image of a document to be registered and attribute information on the document to be registered are registered in the holding unit, the holding unit holds deletion information and the attribute information on the document to be registered in association with each other. In a case where the document to be registered is registered in the holding unit, the searching unit searches the print data held in the holding unit for print data having the deletion information associated with the attribute information on the registered document. The deletion unit deletes at least an image of a document included in the print data found as a result of the search.

8 Claims, 8 Drawing Sheets

| JOB ID | JOB GENERATION DATE | DOCUMENT ID | DOCUMENT TYPE | IMAGE FILE NAME | INFORMATION FILE NAME | PATIENT ID | CLINIC ID |
|---|---|---|---|---|---|---|---|
| J0001 | 7/1/2012 | D0001 | XX-CONSENT | Image0001 | Info01.xml | P0001 | C0001 |
| J0002 | 7/1/2012 | D0002 | PATIENT-REFFERRAL | Image0002 | Info02.xml | P0002 | C0002 |
| J0003 | 8/1/2012 | D0003 | DEATH-CERTIFICATE | Image0003 | Info03.xml | P0001 | C0001 |

FIG. 4

| DOCUMENT ID | DOCUMENT REGISTRATION DATE | DOCUMENT TYPE | IMAGE FILE NAME | INFORMATION FILE NAME | PATIENT ID | CLINIC ID |
|---|---|---|---|---|---|---|
| D0004 | 7/4/2012 | XX-REPORT | Image0004 | Info04.xml | P0001 | C0001 |
| D0005 | 7/5/2012 | REPLY-REFFERRAL | Image0005 | Info05.xml | P0002 | C0002 |
| D0006 | 8/2/2012 | DEATH-CERTIFICATE | Image0003A | Info03.xml | P0001 | C0001 |

FIG. 5

| DOCUMENT TYPE OF REGISTERED DOCUMENT | DELETION EXECUTION CONDITION | TO-BE-DELETED DATA SPECIFYING CONDITION |
|---|---|---|
| XX-REPORT | — | XX-CONSENT |
| REPLY-REFFERRAL | — | PATIENT-REFFERRAL |
| DEATH-CERTIFICATE | — | ALL |
| XX-DOC | YY-DOC | ZZ-DOC |

DOCUMENT MANAGEMENT APPARATUS AND DOCUMENT MANAGEMENT METHOD

CROSS-REFERENCE TO RELATED APPLICATIONS

This application is based on and claims priority under 35 USC 119 from Japanese Patent Application No. 2013-059787 filed Mar. 22, 2013.

BACKGROUND

Technical Field

The present invention relates to a document management apparatus and a document management method.

SUMMARY

According to an aspect of the invention, there is provided a document management apparatus including a holding unit, a searching unit, and a deletion unit. The holding unit holds print data that includes an image of a printed document and attribute information on the printed document. In a case where an image of a document to be registered and attribute information on the document to be registered are registered in the holding unit, the holding unit holds deletion information and the attribute information on the document to be registered in association with each other, the deletion information being information defining attribute information on a document included in print data to be deleted from the holding unit. In a case where the document to be registered is registered in the holding unit, the searching unit searches the print data held in the holding unit for print data having, as attribute information on a document, the deletion information associated with the attribute information on the registered document. The deletion unit deletes at least an image of a document included in the print data found as a result of the search performed by the searching unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described with reference to the drawings.

Configuration of Document Management System 1

Figure 1:
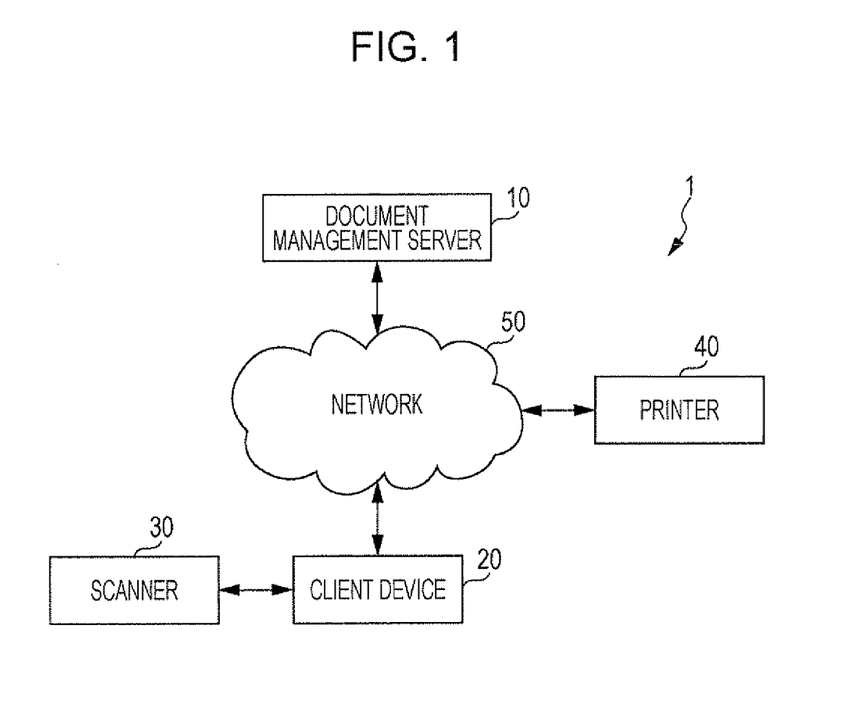
FIG. 1 is a system configuration diagram of a document management system according to an exemplary embodiment.

FIG. 1 is a system configuration diagram of a document management system 1 according to an exemplary embodiment. As illustrated in FIG. 1, the document management system 1 includes a document management server 10, a client device 20, a scanner 30, and a printer 40. In this exemplary embodiment, the document management server 10, the client device 20, and the printer 40 are connected to a network 50, and are capable of communicating data with each other. The client device 20 and the scanner 30 may be connected via wired or wireless links, and are capable of communicating data with each other.

An overview of a process performed in the document management system 1 according to this exemplary embodiment will now be described. In this exemplary embodiment, the document management system 1 is used for medical document management, by way of example. The document management system 1 may also be used for other kinds of document management.

The document management server 10 generates document data in accordance with document editing instructions received from the client device 20, and provides the document data to the client device 20. Further, upon receiving printing instructions from the client device 20, the document management server 10 generates a print image based on document data in accordance with the printing instructions, and transmits the generated print image to the printer 40 to perform printing. Here, the document management server 10 is configured to store processed print images and to provide a desired one of the stored print images in response to a request from the client device 20.

The document management system 1 also performs a process for registering a written document created as a result of a user writing on a printed page output from the printer 40. For example, the client device 20 transmits a document image obtained by scanning the written document using the scanner 30 and auxiliary information concerning the written document to the document management server 10. The document management server 10 registers the written document obtained from the client device 20, searches for a deletable print image among the stored print images in accordance with the registered written document, and deletes the print image found as a result of the search.

The configuration of the document management server 10 and the client device 20 to implement the processes described above and the processes executed by the document management server 10 and the client device 20 will be described in detail.

Figure 2:
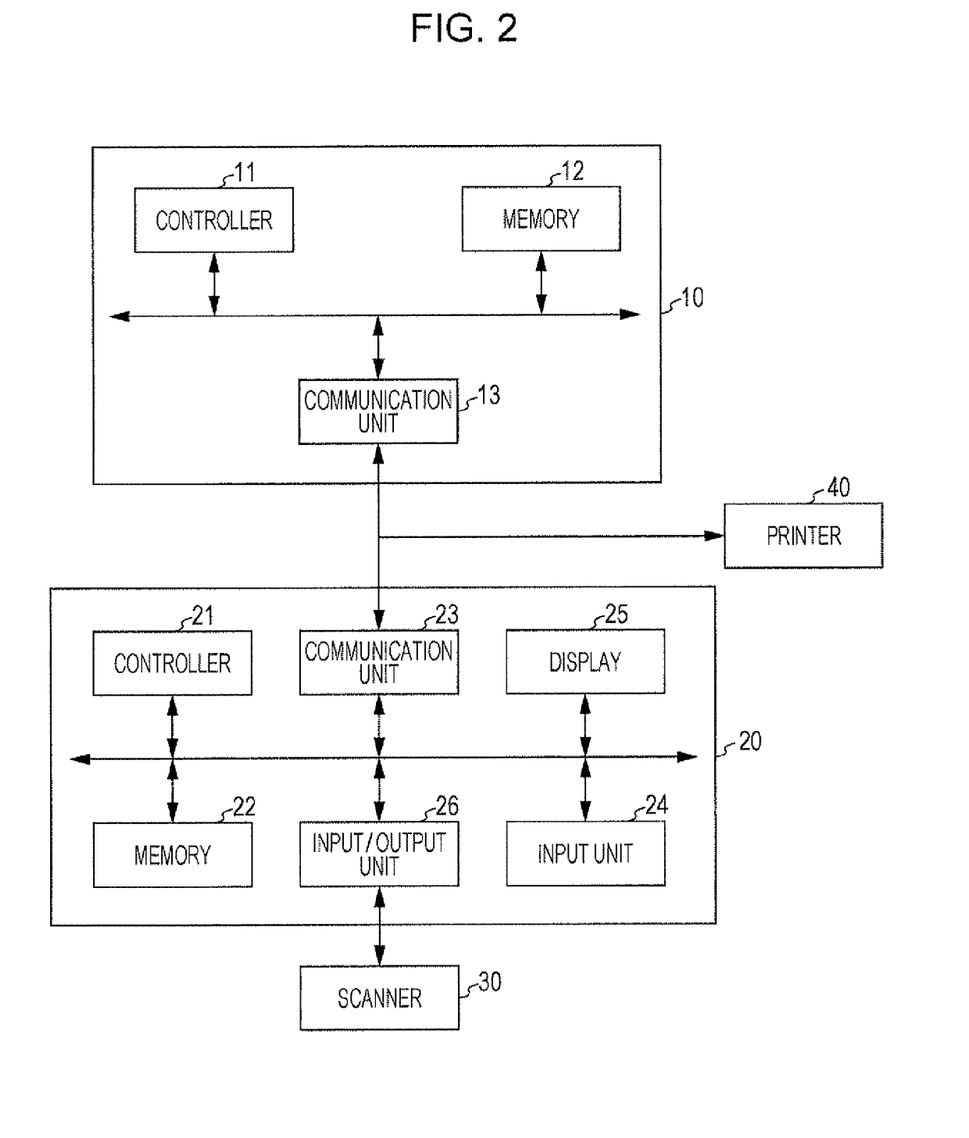
FIG. 2 illustrates an example hardware configuration of a document management server and a client device.

An example hardware configuration of the document management server 10 and the client device 20 will now be described with reference to FIG. 2.

Configuration of Document Management Server 10

First, an example hardware configuration of the document management server 10 will be described. As illustrated in FIG. 2, the document management server 10 includes a controller 11, a memory 12, and a communication unit 13.

The controller 11 includes a central processing unit (CPU). The controller 11 executes various computational processes in accordance with a program stored in the memory 12, and controls the individual units of the document management server 10.

The memory 12 stores programs such as an operating system of the document management server 10 and data, and is also used as a work memory of the controller 11. The programs may be supplied to the document management server 10 in such a manner that they are stored in an information storage medium such as an optical disk, a magnetic disk, a magnetic tape, a magneto-optical disk, or a flash memory, or may be supplied to the document management server 10 via a data communication medium such as the Internet. Examples of the data which may be stored in the memory 12 will be described.

Figure 3:
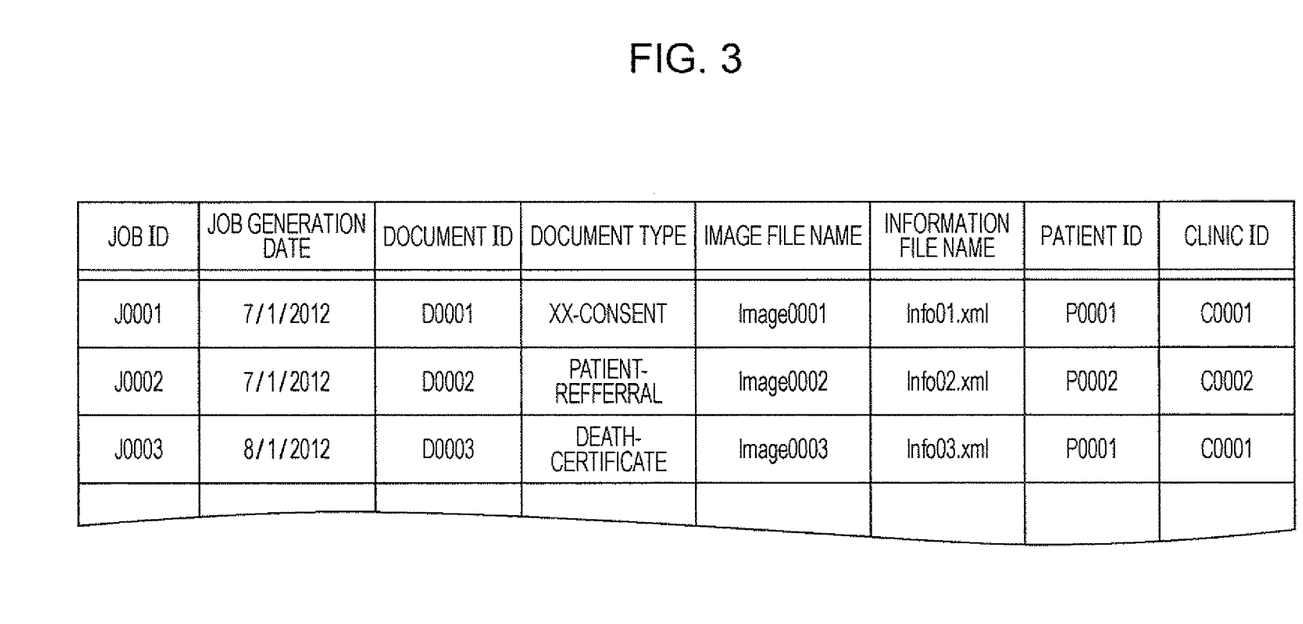
FIG. 3 is a diagram illustrating an example of a print job table.

The memory 12 stores a print job table. FIG. 3 illustrates an example of the print job table. As illustrated in FIG. 3, the print job table stores, in association with each other, job IDs identifying print jobs, the print job generation dates at which the print jobs were generated, document IDs identifying documents (e.g., medical documents) associated with the print jobs, document types indicating the types of the documents, image file names of the print jobs, information file names of the print jobs, patient IDs (or user IDs) identifying patients (or users) associated with the documents, and clinic IDs (or group IDs) identifying clinics (or groups) associated with the documents.

Figure 4:
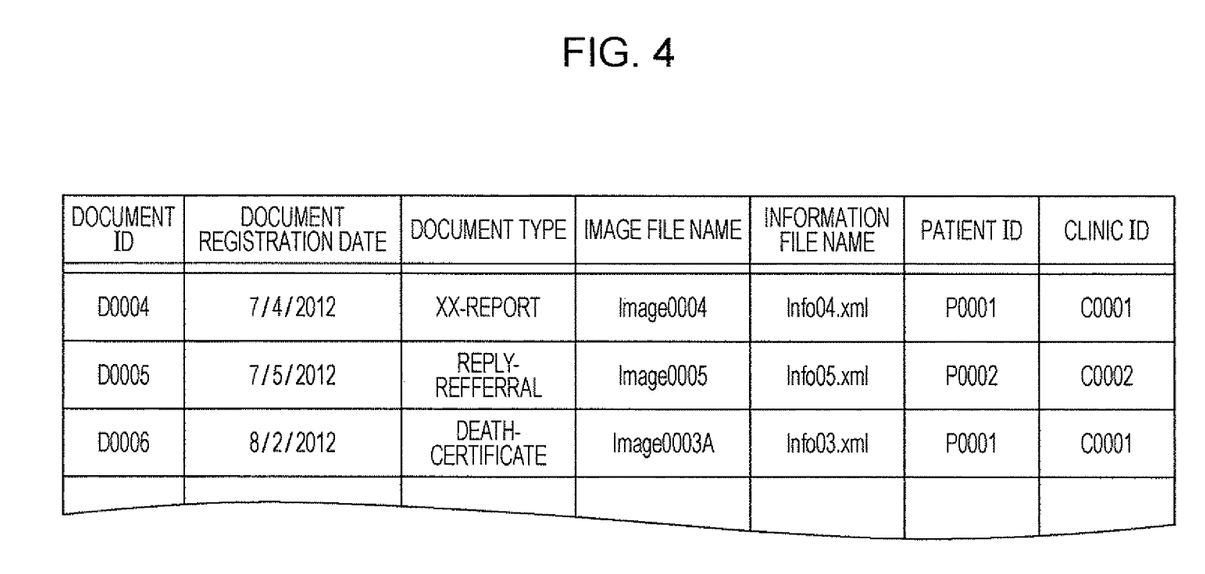
FIG. 4 is a diagram illustrating an example of a document management table.

The memory 12 also stores a document management table. FIG. 4 illustrates an example of the document management table. As illustrated in FIG. 4, the document management table stores, in association with each other, document IDs identifying documents (e.g., medical documents), the document registration dates at which the documents were registered, document types indicating the types of the documents, image file names of the documents, information file names of the documents, patient IDs (or user IDs) identifying patients (or users) associated with the documents, and clinic IDs (or group IDs) identifying clinics (or groups) associated with the documents.

Figure 5:
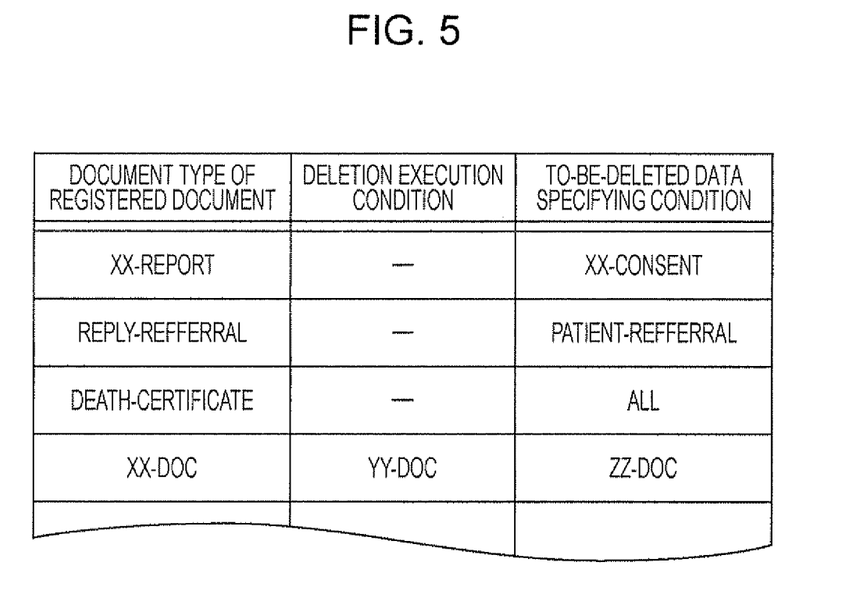
FIG. 5 is a diagram illustrating an example of a deletion condition settings table.

The memory 12 further stores a deletion condition settings table. FIG. 5 illustrates an example of the deletion condition settings table. As illustrated in FIG. 5, the deletion condition settings table stores, in association with each other, document types of registered documents, deletion execution conditions under which deletion is executed, and to-be-deleted data specifying conditions under which data to be deleted is specified. The registered documents are documents newly registered in the document management server 10. When a document is newly registered in the document management server 10, if there is defined a deletion execution condition associated with the document type of the registered document, the document management server 10 specifies data to be deleted in accordance with the to-be-deleted data specifying conditions in a case where a document has already been registered that is identical to the registered document in terms of attribute information (for example, the pair of patient ID and clinic ID) and whose document type has been specified by the deletion execution condition, and deletes the specified data to be deleted. If there is not defined a deletion execution condition associated with the document type of the registered document, the document management server 10 may directly specify data to be deleted in accordance with the to-be-deleted data specifying conditions associated with the document type of the registered document, and delete the specified data to be deleted. When specifying data to be deleted, the document management server 10 may search the print job table for a record that is identical to the registered document in terms of attribute information (for example, the pair of patient ID and clinic ID) and that includes a document type specified by the to-be-deleted data specifying conditions, and delete the data of the print job indicated by the record found as a result of the search.

The communication unit 13 may be implemented by a network interface card, and communicate data with the client device 20, the printer 40, and so forth via a network connected using the network interface card.

Configuration of Client Device 20

Next, an example hardware configuration of the client device 20 will be described. As illustrated in FIG. 2, the client device 20 includes a controller 21, a memory 22, a communication unit 23, an input unit 24, a display 25, and an input/output unit 26.

The controller 21 includes a CPU. The controller 21 executes various computational processes in accordance with a program stored in the memory 22, and controls the individual units of the client device 20.

The memory 22 stores programs such as an operating system of the client device 20 and data, and is also used as a work memory of the controller 21. The programs may be supplied to the client device 20 in such a manner that they are stored in an information storage medium such as an optical disk, a magnetic disk, a magnetic tape, a magneto-optical disk, or a flash memory, or may be supplied to the client device 20 via a data communication medium such as the Internet.

The communication unit 23 may be implemented by, for example, a network interface card, and communicate data with the document management server 10, the printer 40, and so forth via a network connected using the network interface card.

The input unit 24 may be implemented by an input device including, for example, a touch panel and a keyboard, and receive an operation input from a user.

The display 25 may be implemented by a display device such as a liquid crystal display, and display a result (e.g., a screen) of information processing performed by the controller 21.

The input/output unit 26 communicates data with a device (in this exemplary embodiment, the scanner 30) connected via, for example, a serial cable or a network cable. In this exemplary embodiment, the client device 20 instructs the scanner 30 connected via the input/output unit 26 to perform scanning, and acquires scan data (or image data) obtained by scanning an object using the scanner 30.

Process Executed in Document Management System 1

Next, the details of a process performed in the document management system 1 will be described with reference to sequence diagrams and a flow diagram illustrated in FIGS. 6 to 8.

Printing Process

First, an example of a printing process performed in the document management system 1 will be described with reference to the sequence diagram illustrated in FIG. 6.

Figure 6:
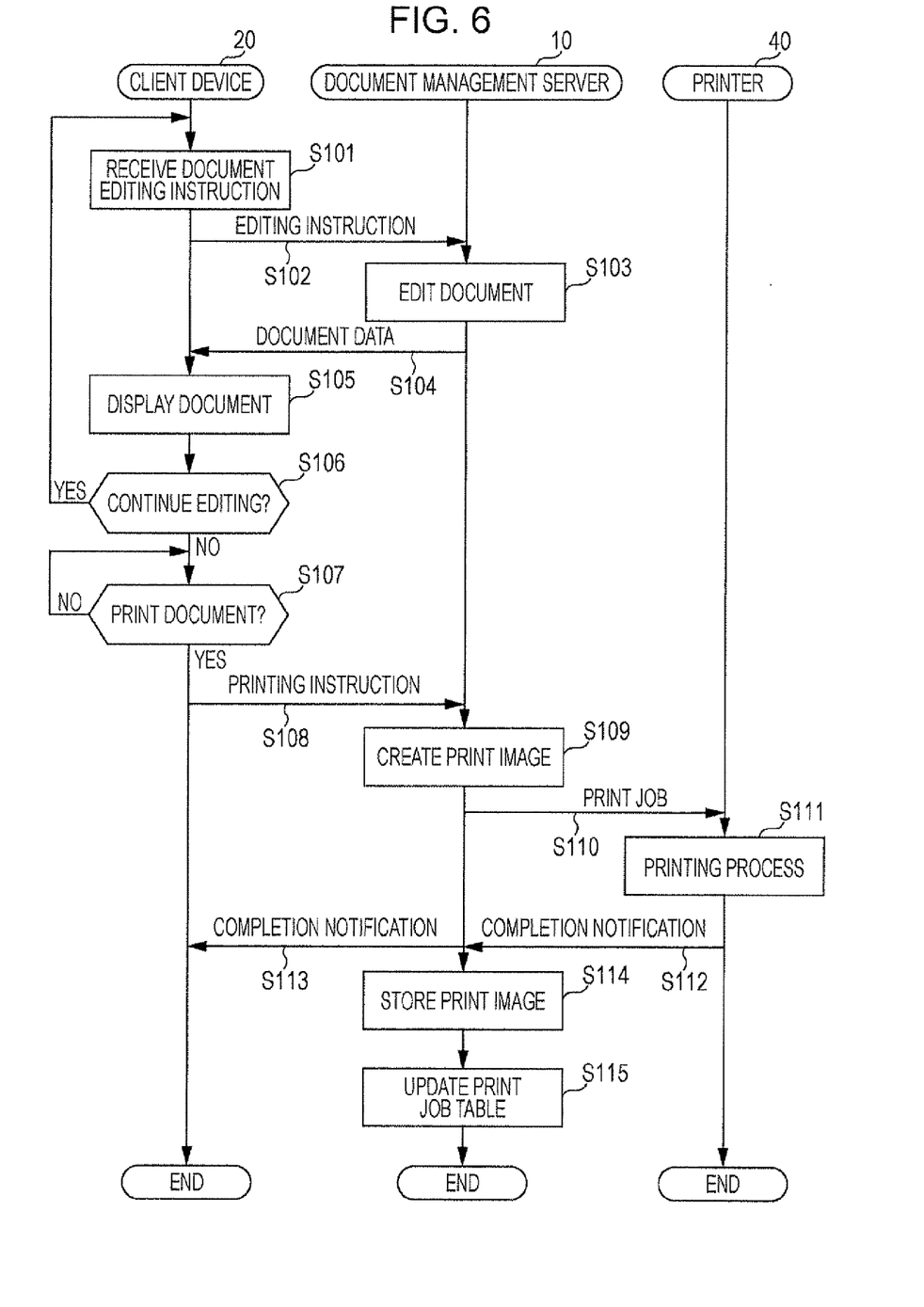
FIG. 6 is a sequence diagram of a printing process.

As illustrated in FIG. 6, upon receiving document editing instructions from a user (S101), the client device 20 transmits the received editing instructions to the document management server 10 (S102). The editing instructions may include, for example, an instruction specifying a document type, an instruction specifying content to be edited in a document, and an instruction finalizing a document.

The document management server 10 edits the document in accordance with the editing instructions received from the client device 20 (S103), and transmits document data of the edited document to the client device 20 (S104). The document management server 10 may temporarily store the data of a document currently being edited in the memory 12, and may store the data of a document, once edited, in the document management table.

The client device 20 displays the document data received from the document management server 10 on a display (S105). If the editing of the document is to be continued (YES in S106), the process returns to S101, whereas, if the editing of the document is not to be continued (that is, if the document has been finalized) (NO in S106), the process proceeds to S107.

If a printing instruction for the edited document (or a specified document) is not received from a user (NO in S107), the client device 20 enters a standby state. If a printing instruction for the edited document (or a specified document) has been received from a user (YES in S107), the client device 20 instructs the document management server 10 to print a document requested in accordance with the printing instruction (S108). The printing instruction may include information specifying a document requested in accordance with the printing instruction, the printer 40, and print settings.

The document management server 10 generates a print image based on data of the document specified by the printing instruction received from the client device 20 (S109). In this case, the document management server 10 may form a code image (for example, a barcode or a two-dimensional code) at a predetermined position of the print image. The code image may be obtained by encoding identification information (a job ID or/and a document ID) identifying a print job (or/and a document).

The document management server 10 generates a print job including the print image generated in S109 and the information on the print settings, and transmits the generated print job to the specified printer 40 (S110).

Upon receiving the print job from the document management server 10, the printer 40 executes a printing process in accordance with the received print job (S111). When the printing process is successfully completed, the printer 40 notifies the document management server 10 of the completion of the printing process (S112).

Upon receiving the notification of the completion of the printing process from the printer 40, the document management server 10 also notifies the client device 20 of the completion of the printing process (S113). Then, the document management server 10 stores the print image for which the printing process has been completed in the memory 12 (S114), and also writes information on the print job for the print image for which the printing process has been completed to the print job table to update the print job table (S115). For example, the document management server 10 may write the job ID of the print job, the date at which the print job was generated, the document ID of the document that has been printed, the document type of the document, the file name of the print image, the information file name of the document, the patient ID identifying the associated patient, the clinic ID identifying the associated clinic in the print job table.

A description has been given of an example of a process executed in the document management system 1 to print a document has been described. In another example, the client device 20 may be configured to generate a print job and a print image, instruct the specified printer 40 to perform printing, and transmit the print job and the print image to the document management server 10 upon receipt of the notification of the completion of the printing process from the printer 40.

Document Registration Process

Next, the details of a process (document registration process) executed to register a written document in a document management apparatus after, for example, blanks have been filled in on a printed document will be described with reference to the sequence diagram illustrated in FIG. 7.

Figure 7:
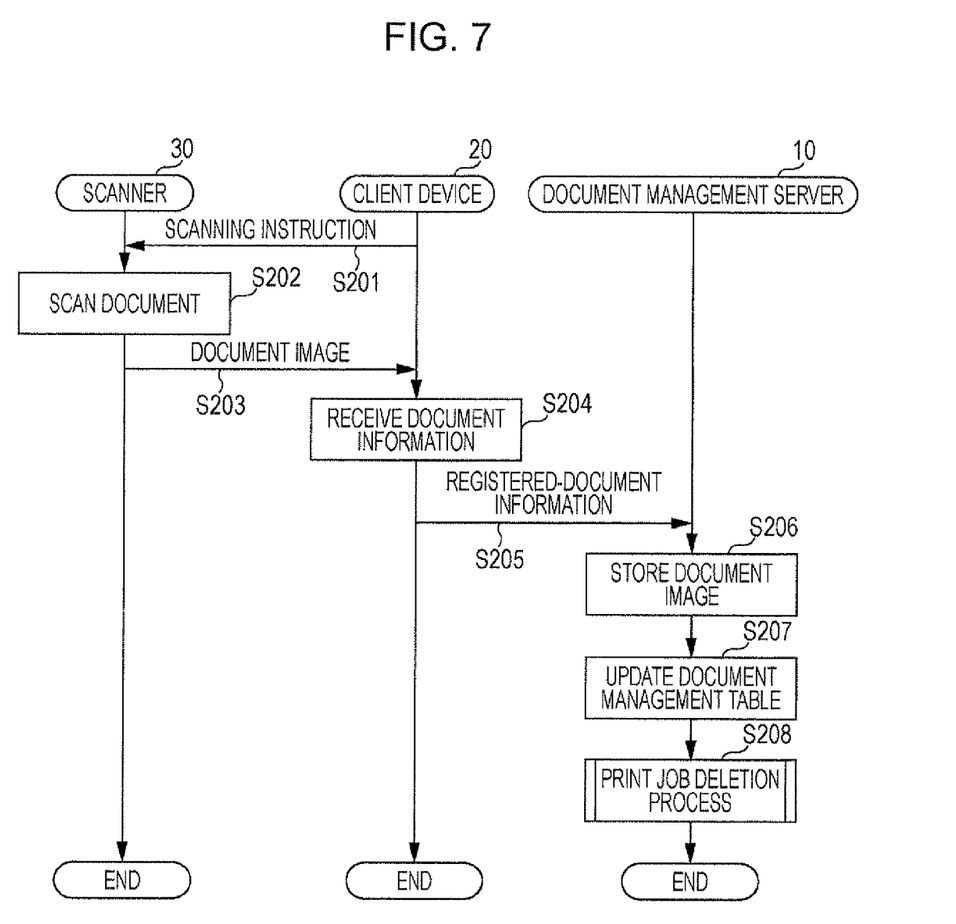
FIG. 7 is a sequence diagram of a document registration process.

As illustrated in FIG. 7, upon receiving an operation for execution of scanning from a user, the client device 20 instructs the scanner 30 connected thereto to perform scanning (S201).

The scanner 30 scans a document in accordance with the scanning instruction received from the client device 20 (S202), and transmits a document image obtained by the scanning of the document to the client device 20 (S203).

Upon receiving document information concerning the document image received from the scanner 30 from the user (S204), the client device 20 generates registered-document information including the document image and the received document information, and transmits the generated registered-document information to the document management server 10 (S205). If the document image has formed therein a code image obtained by encoding identification information identifying a print job or a document, the client device 20 may extract the code image to acquire identification information through decoding, and may include the acquired identification information (print job ID or document ID) in the registered-document information. If the document image does not have formed therein a code image obtained by encoding identification information identifying a print job or a document, the client device 20 may receive an input of information on a document type, a patient ID, and a clinic ID from the user, and may include the received information in the registered-document information.

Upon receiving the registered-document information from the client device 20, the document management server 10 stores the document image included in the received registered-document information in the memory 12 (S206), and also registers document information for the stored document image in the document management table to update the document management table (S207). For example, if the registered-document information includes identification information such as a print job ID or a document ID, the document management server 10 may acquire information on a document ID, a document type, an information file name, a patient ID, and a clinic ID from the print job table on the basis of the identification information, and may register the acquired information and the image file name of the document image in the document management table in association with each other. If the registered-document information does not include identification information such as a print job ID or a document ID, the document management server 10 may specify the associated document ID from the print job table on the basis of the document type, the patient ID, and the clinic ID, which are included in the registered-document information, and may register the specified document ID, the image file name of the document image, the document type, the patient ID, and the clinic ID in the document management table in association with each other. When specifying a document ID from the print job table in accordance with the document type, the patient ID, and the clinic ID, which are included in the registered-document information, the document management server 10 may specify, as an object to be registered, for example, the document ID included in the latest record among the records including document types, patient IDs, and clinic IDs in the print job table.

Then, the document management server 10 executes a print job deletion process (S208). The details of the print job deletion process will be described with reference to the flowchart illustrated in FIG. 8.

Print Job Deletion Process

Figure 8:
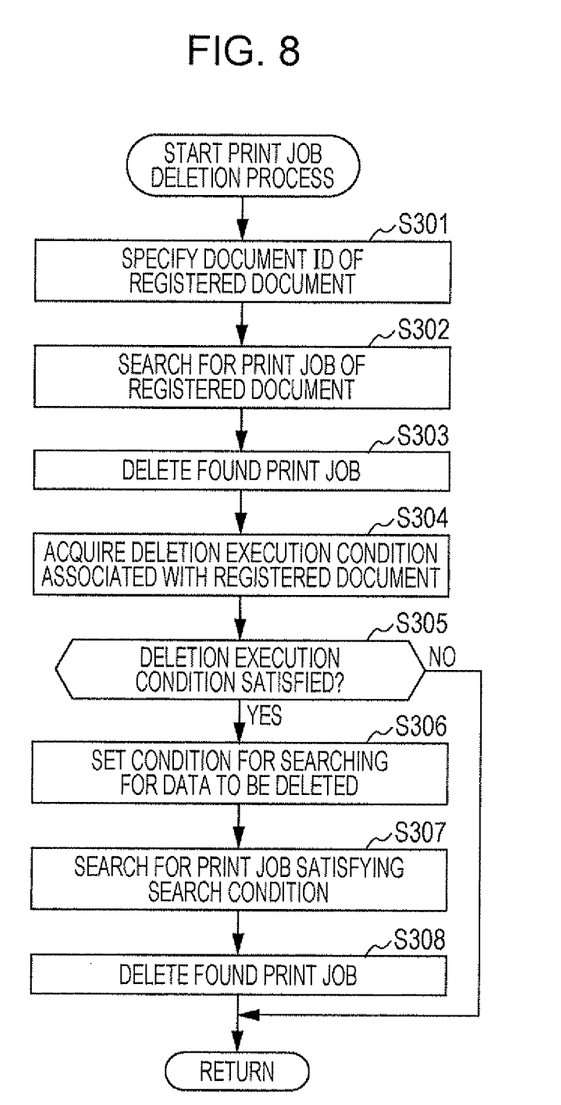
FIG. 8 is a sequence diagram of a print job deletion process.

FIG. 8 illustrates a flowchart of a print job deletion process executed by the document management server 10 after the registration of a document.

As illustrated in FIG. 8, the document management server 10 specifies the document ID of a newly registered document (registered document) (S301), and searches the print job table for the print job ID associated with the document ID using the specified document ID as search key (S302). Then, the document management server 10 deletes the data concerning the print job ID found as a result of the search in S302 (S303). For example, the document management server 10 may search the print job table for a record including the document type, the patient ID, and the clinic ID of the registered document, and may delete at least the file of the print image specified by the record found as a result of the search.

Then, the document management server 10 acquires a deletion execution condition associated with the registered document from the deletion condition settings table if the deletion execution condition is defined in the deletion condition settings table (S304), and determines whether or not the acquired deletion execution condition is satisfied (S305). For example, if the deletion execution condition includes the registration of multiple document types (for example, first and second document types), the document management server 10 may determine that the deletion execution condition is satisfied if both the document of (first document type, patient ID, clinic ID) and the document of (second document type, patient ID, clinic ID) are registered in the document management table.

If it is determined in S305 that the deletion execution condition is not satisfied (NO in S305), the document management server 10 terminates the process without executing the print job deletion process. If it is determined in S305 that the deletion execution condition is satisfied (YES in S305), the document management server 10 performs the subsequent processing.

The document management server 10 acquires a specific condition under which data to be deleted that is associated with the registered document is specified, and sets a search condition under which the data to be deleted is searched for in accordance with the acquired specific condition (S306). For example, the document management server 10 may set, based on the document type (document type designated to be deleted) specified by the specific condition, the search conditions (search queries) (document type="document type designated to be deleted" and patient ID="patient ID associated with registered document" AND clinic ID="clinic ID associated with registered document"). If the document type designated to be deleted is "ALL", the search conditions are (patient ID="patient ID associated with registered document" AND clinic ID="clinic ID associated with registered document"). The specific condition may be information specifying at least one of identification information identifying data to be deleted and attribute information.

The document management server 10 searches the print job table for a record satisfying the search condition set in S306 (S307), and deletes a print image (and also a print job) specified by each record found as a result of the search (S308). Then, the process ends.

In the document management system 1 described above, when a document is registered, print data to be deleted is searched for in accordance with a condition determined for the registered document, and the print data found as a result of the search is deleted. This allows mechanical deletion of print data which is no longer necessary because of the registration of the document.

The present invention is not limited to the foregoing exemplary embodiment. For example, the document management server 10 may use a document for a print job as a registered document after the print job has been registered, and execute the flowchart illustrated in FIG. 8.

While the foregoing exemplary embodiment has been described in the context of management of medical documents, exemplary embodiments of the present invention may provide management of documents for various other purposes such as commercial transactions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
    a holding unit configured to hold print data of a first document that has been printed and first document attribute information that is associated with the printed first document;
    a receiving unit configured to receive a second document, register the second document in the document management apparatus, and store second document attribute information that is associated with the registered second document, the registered second document being a document prepared by a user in response to the first document being printed;
    a searching unit configured to, in response to the second document being registered, searches the first document attribute information that matches the stored second document attribute information that is associated with the registered second document; and
    a deletion unit configured to delete the print data of the first document that is associated with the first document attribute information searched by the searching unit.

2. The document management apparatus according to claim 1,
    the document management apparatus further comprising:
    a delete condition setting table; and
    a determination unit configured to determine whether or not all of the second documents having the associated first document attribute information in the delete condition setting table have been registered in the document management apparatus,
    wherein, in the delete condition setting table, two or more second document attribute information of the registered second document are previously associated with the first document attribute information of the first document, and
    wherein the deletion unit deletes the print data of the first document when the determination unit determines that all of the second documents having the associated first document attribute information in the delete condition setting table have been registered in the document management apparatus.

3. A document management method comprising the steps of:
    holding print data of a first document that has been printed and first document attribute information that is associated with the printed first document;
    receiving a second document, registering the second document, and storing second document attribute information that is associated with the registered second document, the registered second document being a document prepared by a user in response to the first document being printed;
    holding a delete condition setting table, in which the first document attribute information of the printed first document is associated with the second document attribute information of the registered second document;

in response to the second document being registered, searching the document attribute information that matches the second document attribute information of the registered second document; and deleting the print data of the first document that is associated with the first matching document attribute information searched in the searching step, wherein the steps are executed by a processor.

4. The document management apparatus according to claim 1, wherein the attribute information includes at least a patient ID and a clinic ID.

5. The document management apparatus according to claim 1, the document management apparatus further comprising:

a delete condition setting table; and a determination unit configured to determine whether or not all kinds of the registered second documents having the associated first document attribute information in the delete condition setting table have been registered in the document management apparatus, wherein, in the delete condition setting table, two or more kinds of the registered second documents are previously associated with the first document attribute information of the first document, and wherein the deletion unit deletes the print data of the first document when the determination unit determines that all of the registered second documents having the associated first document attribute information in the delete condition setting table have been registered in the document management apparatus.

6. The document management apparatus according to claim 1, wherein the holding unit is configured to hold a print job table for the first document, the searching unit, in response to the second document being registered, searches for the print job of the first document held in the holding unit based on the matching document attribute information, and the deletion unit is configured to delete the print job of the first document having the matching document attribute information.

7. The document management apparatus according to claim 1, wherein the first document and the second document are of different document types.

8. The document management apparatus according to claim 6, wherein the first document and the second document are of different document types.

* * * * *